United States Patent Office 3,196,135
Patented July 20, 1965

3,196,135
VULCANIZATION OF HALOGENATED
RUBBERY POLYMERS
Delmer L. Cottle, Highland Park, and Leon S. Minckler, Jr., Metuchen, N.J., assignors to Esso Research and Engineering Company, a corporation of Delaware
No Drawing. Continuation of application Ser. No. 67,886, Nov. 8, 1960. This application July 8, 1964, Ser. No. 381,225
13 Claims. (Cl. 260—79.5)

The present invention relates to improved vulcanizable compositions of halogenated rubbery polymers. More particularly, it deals with curing halogenated isoolefin-multiolefin copolymers, e.g., halogenated butyl rubber, at an accelerated rate to give a vulcanizate of improved physical and dynamic properties.

This application is a continuation of application Serial No. 67,886, filed November 8, 1960, now abandoned.

Copolymers of the above general class, particularly where the copolymers contain about 85 to 99.5 wt. percent of a $C_4$ to $C_8$ isoolefin, e.g., isobutylene, 3-methyl butene-1, with about 15 to 0.5 wt. percent of a multiolefin of about 4 to 14 carbon atoms, e.g., myrcene, isoprene, butadiene, etc., are well known in the literature as "butyl rubber." For example, see "Synthetic Rubber," by G. S. Whitby (1954), and U.S. Patent 2,356,128 among many others. Halogenated butyl rubber-type copolymers are produced by halogenating butyl rubber in a manner which does not substantially degrade its molecule weight but, however, gives a rubbery product of substantially different properties than the unhalogenated material. Butyl rubber may be halogenated at temperatures of −50° to 200° C., preferably 0° to 100° C., at pressures of 0.5 to 900 p.s.i.a. with suitable halogenating agent such as gaseous chlorine, liquid bromine, iodine monochloride, etc. Halogenation may be accomplished in various ways. For example, the halogenation agent, e.g., chlorine, may be added to a solution of the copolymer in a suitable inert liquid organic solvent. The resulting halogenated polymer may be recovered by precipitation with a nonsolvent at about 0° to 180° C., spray drying, or by flashing off the hydrocarbon solvent by injection into a hot water bath.

Preferably, the degree of halogenation is carefully regulated so that the halogenated copolymer contains at least 0.5 wt. percent of combined halogen, but not more than about one atom of combined fluorine or chlorine per double bond in the polymer, nor more than three atoms of combined bromine or iodine per double bond. A more detailed description of the formation of chlorinated butyl rubber may be had by referring to coassigned U.S. Patent 2,944,578, filed May 31, 1955.

The halogenated copolymer has a viscosity range average molecular weight of about 100,000 to 2,000,000, and a mole percent unsaturation of between 0.1 to 20, preferably less than 10. As hereinafter employed in the specification, the term "halogenated butyl rubber" denotes the above described halogenated copolymers of a major portion of a $C_4$ to $C_8$ isoolefin and a minor portion of a $C_4$ to $C_{14}$ multiolefin.

Various cure systems have been suggested for curing halogenated butyl rubber polymers. Examples of systems which have been investigated are the following: 2,4-dithiobiuret, 4-amino-antipyrine, triphenyl guanidine, indole, 2-thiobarbituric acid, 1,2-diphenoxyethane, 4,4′-bis(O-methoxyphenyl) carbonate, 4,4′-bis(dimethylamino) thiobenzophenone, bis(mercaptoalkyl) sulfide, zinc acrylate, quinone imine compounds, ethylene dithiocyanate, ethylene mono- and di- thiocarbonate, dicarboxylic acids, thiobenzoic acids, N-(2-thiazolyl) thiourea, alkyl, aryl or alkyl-aryl tin oxides, 2,2′-dithiodibenzoic acid, paraformaldehyde and/or nonyl phenol, 2-thiazolidinethione, thiazoles and derivatives of thiazoles such as amino thiazole, p-aminophenyl-mercaptoacetic acid, condensation products of polymerized linoleic acid with polyamines, imidazoles such as 2-aminobenzimidazole, 2-mercaptoimidazoline (particularly in the presence of anhydrous silica of pH 3.5 to 4.5), polymeric bottoms remaining recovered from the production of aldehyde-phenol reaction products, polymeric aniline-acetone reaction products (Age Rite Resin D), pentaerythritol tetrathioglycolate, dithiooxamides, etc. Particularly for covulcanizing halogenated butyl with high unsaturation rubbers, cure systems such as the combination of triphenyl guanidine, sulfur and zinc oxide, or the combination of tetramethyl thiuram disulfide and zinc oxide have been employed.

However, due to the relatively saturated nature of halogenated butyl rubber, one of the difficulties still presented at its utilization is its relatively low cure rate as compared with highly unsaturated rubbers such as natural rubber. Relatively fast cures are desired in various applications for rubbery copolymers such as extrusion of tubes, conveyor belting and wire coatings. The above described cure systems have not proven to be effective in solving this difficulty.

It has now been found that halogenated butyl rubber can be cured in a relatively short period of time to give vulcanizates of good properties, both physical and dynamic, by employing minor proportions (based on rubbery polymer) of a member of the group consisting of thiosemicarbazones, oxime thiosemicarbazones, thiosemicarbazides and thiocarbazides. Not only is cure time reduced through the use of the above compounds as curatives, but additionally it has been found that they produce vulcanizates of improved properties when employed for relatively long curing periods, e.g., 45 minutes.

The compositions of the present invention may be cured under a broad range of temperatures, e.g., 200° to 450° F., preferably 250° to 350° F., as well as under various conditions, e.g., open steam heating, oven curing during extrusion, molding, etc. The curing period may vary from about 2 minutes to several hours, preferably about 5 to 60 minutes, depending on temperature. Normally, about 0.1 to 20, preferably 0.5 to 10 wt. percent based on halogenated polymer of a member of a group consisting of thiosemicarbazones, oxime thiosemicarbazones, thiosemicarbazides, and thiocarbazides is employed in the curing recipe.

The above compounds may be employed as the sole curing agent. Alternatively, they may be utilized in conjunction with metallic oxides such as zinc oxide, stannous oxide, magnesium oxide, etc., the metallic oxide comprising 0.5 to 25, preferably 1 to 10, wt. percent based on halogenated polymer of the recipe. Such combinations of ingredients are particularly effective in obtaining fast tight cures. In general, the presence of elemental sulfur as a curing agent is neither necessary nor desirable in the compositions of the present invention. Although a less desirable embodiment of the present invention, very small quantities,, e.g. 0.1 to 3 wt. percent, of the present curing compounds may be used as vulcanization accelerators for conventional cure systems as opposed to being prime curing agents themselves. If desired, various members of the present group of curing agents may be used together.

Vulcanization recipes prepared in accordance with the present invention may contain various additional materials, such as carbon black, mineral fillers, pigments, antioxidants, extender oils, antitack agents, etc. If desired, blends of halogenated butyl and other rubbers, e.g., natural rubber, neoprene, butadiene-styrene polymers, etc., may be cured with the compounds of the present invention.

It is noted that although recently it has been suggested that various amine compounds may be used as curing agents for halogenated butyl rubber, the present specific class of materials is unusual in giving high quality vulcanizates within short curing periods.

Compounds suitable for the practice of the present invention may be represented by the following generic formulas:

Thiosemicarbazones:

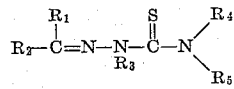

Oxime thiosemicarbazones:

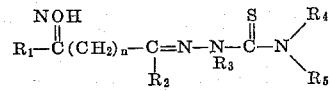

Thiosemicarbazides:

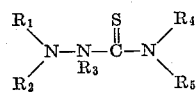

Thiocarbazides:

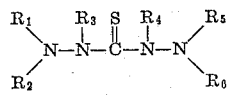

(1,2-dehydrothiocarbazides):

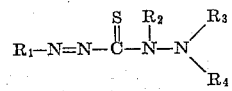

(1,2,4,5-dehydrothiocarbazides):

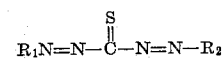

wherein $n$ is an integer from 0 to 10, and $R_1$, $R_2$, $R_3$, $R_4$, $R_5$, and $R_6$ are selected from the group consisting of hydrogen, and $C_1$ to $C_{20}$ alkyls, preferably having 1 to 10 carbon atoms, and $C_6$ to $C_{20}$ aryls.

Examples of suitable compounds are as follows:

(A) Thiosemicarbazones:
  Acetaldehyde thiosemicarbazone
  Acetone thiosemicarbazone
  1-butanal thiosemicarbazone
  2-butanone thiosemicarbazone
  Acetophenone thiosemicarbazone
  Benzaldehyde thiosemicarbazone
(B) Oxime thiosemicarbazones:
  2-propanone-1-al oxime thiosemicarbazone
  2-propanone-1-al thiosemicarbazone oxime
  2,3-pentanedione oxime thiosemicarbazone
  Glyoxal oxime thiosemicarbazone
  Benzyl oxime thiosemicarbazone
(C) Thiosemicarbazides:
  1-phenyl thiosemicarbazide
  2-benzyl thiosemicarbazide
  3-methyl thiosemicarbazide
  1,3-diethyl thiosemicarbazide
  1-cyclohexyl-3-methyl thiosemicarbazide
(D) Thiocarbazides:
  1,5-diphenyl-3-thiocarbazide
  1,2-dimethyl-3-thiocarbazide
  1,4-ethylmethyl-3-thiocarbazide
  1,2,4,5-tetramethyl-3-thiocarbazide
  1,5-dimethyl-1,5-diethyl-3-thiocarbazide
  1-benzyl-5-α-naphthyl-3-thiocarbazide
  1-phenyl-1,2-dehydro-3-thiocarbazide
  1,1-di-n-butyl-4,5-dehydro-5-phenyl-3-thiocarbazide
  1-benzyl-5-methyl-1,2-dehydro-3-thiocarbazide
  1-α-naphthyl-4-phenethyl-1,2-dehydro-3-thiocarbazide
  1-cyclohexyl-5-isobutyl-1,2-dehydro-3-thiocarbazide
  1,5-dimethyl-1,2,4,5-dehydro-3-thiocarbazide
  1-methyl-5-phenyl-1,2,4,5-dehydro-3-thiocarbazide
  1-allyl-5-benzyl-1,2,4,5-dehydro-3-thiocarbazide
  1-benzyl-5-isopropyl-1,2,4,5-dehydro-3-thiocarbazide
  1,5-diphenyl-1,2,4,5-dehydro-3-thiocarbazide The terms "thiosemicarbazones," "oxime thiosemicarbazones," "thiosemicarbazides," and "thiocarbazides" as employed in the specification denote compounds illustrated by the above structural formulas. The term "thiocarbazides" includes thiocarbazides and dehydrothiocarbazide compounds.

Various aspects and modifications of the present invention will be made more clearly apparent by reference to the following description in the accompanying examples.

In the following examples, a typical chlorinated butyl rubber, hereinafter denoted "chlorinated butyl rubber A," and a typical brominated butyl rubber, hereinafter denoted "brominated butyl rubber B," were employed. These halogenated butyl rubbers were characterized as follows:

| Properties | Chlorinated Butyl Rubber A | Brominated Butyl Rubber B |
|---|---|---|
| Wt. Percent Isobutylene | 98 | 98 |
| Wt. Percent Isoprene | 2 | 2 |
| Wt. Percent Halogen | 1.3 | 2.3 |
| Mole Percent Unsaturation | 0.8 | 0.7 |
| Viscosity Average: Molecular Weight | 375,000 | 400,000 |

EXAMPLE 1

Chlorinated butyl rubber A was compounded with a typical thiocarbazide, namely, 1,5-diphenyl-1,2-dehydro-3-thiocarbazide, in accordance with the recipe shown on Table I. The various ingredients were mixed on a rubber mill in a conventional manner, their proportions being shown in parts by weight. The recipes were then vulcanized at a temperature level of 307° F. for 15 minutes and 45 minutes, respectively. The vulcanizates had the properties indicated.

Table I

| | A | B |
|---|---|---|
| Compound: | | |
| Chlorinated Butyl Rubber A | 100 | 100 |
| Carbon Black | 50 | 50 |
| Stearic Acid | 1.0 | 1.0 |
| Zinc Oxide | 5.0 | 5.0 |
| 1,5-diphenyl-1,2-dehydro-3-thiocarbazide | | 5.0 |
| Cured 15'/307° F: | | |
| Modulus, psi/300% | 285 | 2,145 |
| Tensile, p.s.i. | 450 | 2,280 |
| Elongation, percent | 700 | 355 |
| Cured 45'/307° F: | | |
| Modulus, psi/300% | 1,465 | 2,025 |
| Tensile, p.s.i. | 2,050 | 2,225 |
| Elongation, percent | 410 | 345 |
| Goodrich Flexometer (45'/307° F.) | | |
| Dynamic Drift, percent | Failed | 0.0 |
| Final Dynamic Comp., percent | | 2.9 |
| Comp., Set., percent | | 1.6 |

As shown above, vulcanizates obtained by the use of a thiocarbazide as a curing agent showed improved physical and dynamic properties when cured for both a relatively short and more extended curing times.

EXAMPLE 2

In the same manner as described with regard to Example 1, brominated butyl rubber B was compounded with a thiocarbazide and cured for the periods indicated in Table II.

Table II

| Compound: | 1 | 2 | 3 |
|---|---|---|---|
| Brominated Butyl Rubber B | 100 | 100 | 100 |
| Carbon Black (Philblack-O) | 50 | 50 | 50 |
| Stearic Acid | 1 | 1 | 1 |
| Zinc Oxide | 5 | | 5 |
| 1,2-diphenyl-1,2-dehydro-3-thiocarbazide | | 5 | 3 |
| Cured 15'/307° F.: | | | |
| Modulus, p.s.i./300% | 1,125 | 1,475 | 2,545 |
| Tensile, p.s.i. | 2,360 | 2,640 | 2,545 |
| Elongation, percent | 495 | 500 | 300 |
| Cured 45'/307° F.: | | | |
| Modulus, p.s.i./300% | 1,230 | 2,055 | 2,220 |
| Tensile, p.s.i. | 2,390 | 2,535 | 2,390 |
| Elongation, percent | 485 | 395 | 335 |
| Air Oven Aging (48 hours/300° F.) Cured 45'/307° F.: | | | |
| Modulus, p.s.i./300% | | | |
| Tensile, p.s.i. | 445 | 950 | 1,415 |
| Elongation, percent | 240 | 235 | 225 |
| Goodrich Flexometer (45'/307° F.): | | | |
| Final Dynamic Comp., percent | 16.3 | 10.4 | 5.8 |
| Comp. Set, percent | 4.1 | 6.5 | 1.7 |

As shown in Table II, vulcanizates of both improved physical and dynamic properties are obtained when thiocarbazides are utilized to cure brominated butyl rubber. Of particular interest is the outstanding heat-aging properties thereby obtained, particularly those secured in the presence of zinc oxide.

EXAMPLE 3

To illustrate the use of oxime thiosemicarbazones to cure halogenated butyl rubber, chlorinated butyl rubber A was compounded with a typical oxime thiosemicarbazone, i.e., 2,3-butanedione oxime thiosemicarbazone, in the manner indicated in Table III, the proportions of materials being shown in parts by weight. The recipes were then cured at 307° F. for the periods indicated to give vulcanizates having the properties shown in Table III.

Table III

| | A | B |
|---|---|---|
| Compound: | | |
| Chlorinated Butyl Rubber A | 100 | 100 |
| Carbon Black (Philblack-O) | 50 | 50 |
| Stearic Acid | 1.0 | 1.0 |
| Zinc Oxide | 5.0 | 5.0 |
| 2,3-Butanedione Oxime Thiosemicarbazone | | 3.0 |
| Cured 15'/307° F.: | | |
| Modulus, p.s.i./300% | 285 | 2,245 |
| Tensile, p.s.i. | 450 | 2,530 |
| Elongation, percent | 700 | 340 |
| Cured 45'/307° F.: | | |
| Modulus, p.s.i./300% | 1,465 | |
| Tensile, p.s.i. | 2,050 | 2,360 |
| Elongation, percent | 410 | 250 |
| Goodrich Flexometer, (45'/307° F.): | | |
| Dynamic Drift, percent | Failed | 0.0 |
| Final Dynamic Comp., percent | | 0.5 |
| Comp. Set, percent | | 1.9 |

As illustrated above, chlorinated butyl rubber A cured in accordance with the present invention had markedly improved properties, particularly with respect to a 15 minute curing period.

EXAMPLE 4

Brominated butyl rubber B was compounded with an oxime thiosemicarbazone, as shown in Table IV, and the various recipes then cured. The properties of the resulting vulcanizates are set forth in the following table.

Table IV

| Compound: | 1 | 2 | 3 |
|---|---|---|---|
| Brominated Butyl Rubber B | 100 | 100 | 100 |
| Carbon Black (Philblack-O) | 50 | 50 | 50 |
| Stearic Acid | 1 | 1 | 1 |
| Zinc Oxide | 5 | | 5 |
| 2,3-Butanedione Oxime Thiosemicarbazone | | 5 | 3 |
| Cured 15'/307° F.: | | | |
| Modulus, p.s.i., 300% | 1,125 | 1,295 | 2,350 |
| Elongation, Percent | 495 | 455 | 390 |
| Cured 45'/307° F.: | | | |
| Modulus, p.s.i./300% | 1,230 | 2,000 | 2,360 |
| Tensile, p.s.i. | 2,390 | 2,775 | 2,360 |
| Elongation, Percent | 485 | 390 | 300 |
| Goodrich Flexometer (45'/307° F.): | | | |
| Dynamic Drift, Percent | 3.8 | 1.6 | 0.0 |
| Final Dynamic Comp., Percent | 16.3 | 10.1 | 7.6 |
| Comp. Set, Percent | 4.1 | 5.9 | 1.3 |

Table IV illustrates that oxime thiosemicarbazones give vulcanizates having improved properties when utilized either alone or in conjunction with zinc oxide. The improvement in modulus for a 15 minute cure is particularly noted as indicative of the fact that the present systems give fast, tight cures.

EXAMPLE 5

Chlorinated butyl rubber A was compounded with thiosemicarbazide, as shown in Table V. The recipes were then cured for 15 minutes, and for 45 minutes at 307° F., the vulcanizates having the physical and dynamic properties indicated.

Table V

| | A | B |
|---|---|---|
| Compound: | | |
| Chlorinated Butyl Rubber A | 100 | 100 |
| Carbon Black (Philblack-O) | 50 | 50 |
| Stearic Acid | 1.0 | 1.0 |
| Zinc Oxide | 5.0 | |
| Thiosemicarbazide | | 5.0 |
| Cured 15'/307° F.: | | |
| Modulus, p.s.i./300% | 285 | 1,000 |
| Tensile, p.s.i. | 450 | 1,840 |
| Elongation, Percent | 700 | 465 |
| Cured 45'/307° F.: | | |
| Modulus, p.s.i./300% | 1,465 | 2,095 |
| Tensile, p.s.i. | 2,050 | 2,235 |
| Elongation, Percent | 410 | 330 |
| Goodrich Flexometer (45'/307° F.): | | |
| Dynamic Drift, Percent | Failed | 1.4 |
| Final Dynamic Comp., Percent | | 7.5 |
| Comp. Set, Percent | | 7.1 |

As indicated above, in contrast to the very low quality vulcanizates obtained when employing a conventional cure system for a short period of time, the present invention offers vulcanizates having markedly improved properties. Both the dynamic and physical properties of the vulcanizates obtained by the use of thiosemicarbazide were substantially better than those obtained by the use of zinc oxide. The data illustrate that thiosemicarbazides may readily be employed in the absence of metallic oxides.

EXAMPLE 6

In a manner similar to that previously described, brominated butyl rubber B was compounded with thiosemicarbazide and cured for various periods at 307° F. The vulcanizates thereby obtained had the properties shown in Table VI.

Table VI

| | 1 | 2 | 3 |
|---|---|---|---|
| Compound: | | | |
| Brominated Butyl Rubber B | 100 | 100 | 100 |
| Philblack-O | 50 | 50 | 50 |
| Stearic Acid | 1 | 1 | 1 |
| Zinc Oxide | 5 | | 5 |
| Thiosemicarbazide | | 5 | 3 |
| Cured 15'/307° F.: | | | |
| Modulus, p.s.i./300% | 1,125 | 2,275+ | 1,680 |
| Elongation, percent | 495 | 280 | 300 |
| Cured 45'/307° F.: | | | |
| Modulus, p.s.i./300% | 1,230 | 2,100+ | 1,800 |
| Elongation, percent | 485 | 230 | 300 |
| Goodrich Flexometer (45'/307° F.): | | | |
| Dynamic Drift, percent | 3.8 | 0.0 | 0.0 |
| Final Dynamic Comp., percent | 16.3 | 3.4 | 11.5 |
| Comp. Set, percent | 4.1 | 1.8 | 1.9 |

As illustrated by Table VI, vulcanizates obtained by the use of thiosemicarbazide alone or in conjunction with zinc oxide had improved both physical and dynamic properties as compared with a conventional zinc oxide cure.

Various modifications may be made to the present invention. For example, the present curing agents may be utilized with other halogenated polymers such as those derived from ethylene-propylene copolymers, ethylene-butene-1 copolymers, polypropylene, chloroprene, etc.

Having described the present invention, that which is sought to be protected is set forth in the following claims.

We claim:

1. A composition comprising a halogenated rubbery copolymer containing at least 0.5 wt. percent halogen and wherein the amount of halogen and the halogen are correlated and selected from the group consisting of not more than about 1 atom of combined chlorine per double bond in the copolymer and not more than about 3 atoms of combined bromine per double bond in the copolymer and formed by copolymerizing a major portion of a $C_4$ to $C_8$ isoolefin with a minor proportion of a $C_4$ to $C_{14}$ multiolefin and halogenating the copolymer, and containing between about 0.5 and about 20.0 wt. percent based on the halogenated rubbery copolymer, of at least one nitrogen-sulfur-containing compound as a curing agent and selected from the group consisting of:

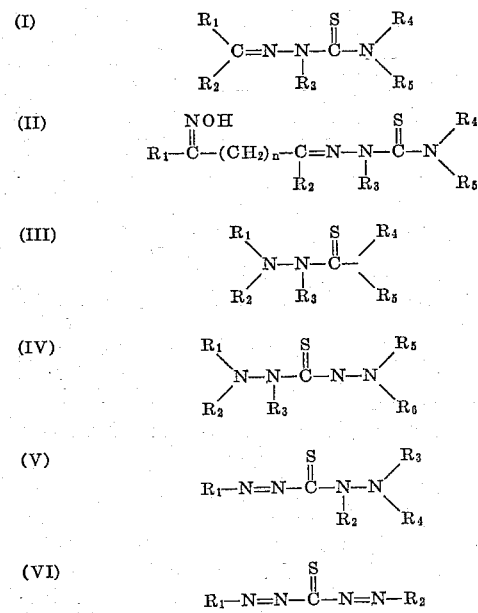

wherein $n$ is an integer from 0 to 10 and $R_1$, $R_2$, $R_3$, $R_4$, $R_5$ and $R_6$ are radicals selected from the group consisting of hydrogen, $C_1$ to $C_{20}$ alkyl and $C_6$ to $C_{20}$ aryl.

2. A composition as in claim 1 wherein the copolymer is a chlorinated rubbery copolymer of isobutylene and isoprene.

3. A composition as in claim 1 wherein the copolymer is a brominated rubbery copolymer of isobutylene and isoprene.

4. A composition as in claim 1 wherein the rubbery copolymer is formed with between about 85 and about 99.5 wt. percent of the isoolefin and between about 15 and about 0.5 wt. percent of the multiolefin.

5. A composition as in claim 1 wherein the nitrogen-sulfur containing compound is 1,5-diphenyl-1,2-dehydro-3-thiocarbazide.

6. A composition as in claim 1 wherein the nitrogen-sulfur containing compound is 2,3-butanedione oxime thiosemicarbazone.

7. A composition as in claim 1 wherein the nitrogen-sulfur containing compound is thiosemicarbazide.

8. A process for vulcanizing a halogenated rubbery copolymer containing at least 0.5 wt. percent halogen and wherein the amount of halogen and the halogen are correlated and selected from the group consisting of not more than about 1 atom of combined chlorine per double bond in the copolymer and not more than about 3 atoms of combined bromine per double bond in the copolymer and formed by copolymerizing a major portion of a $C_4$ to $C_8$ isoolefin with a minor proportion of a $C_4$ to $C_{14}$ multiolefin and halogenating the copolymer which comprises compounding with said halogenated copolymer between about 0.5 to about 20.0 wt. percent based on the halogenated copolymer of at least one nitrogen-sulfur containing compound, as a curing agent, and selected from the group consisting of

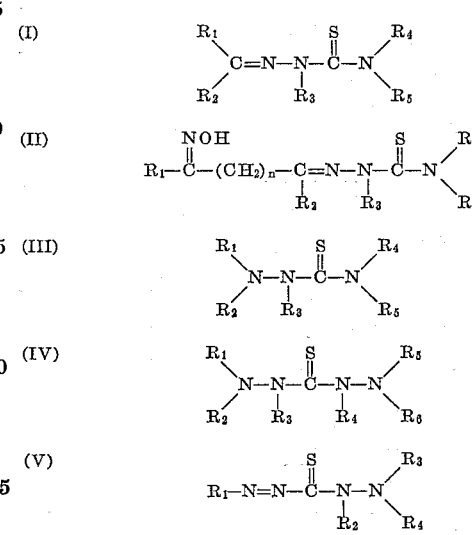

and curing the resultant admixture at a temperature between about 200 and about 450° F.

9. A process as in claim 8 wherein the copolymer is a chlorinated rubbery copolymer of isobutylene and isoprene.

10. A process as in claim 8 wherein the copolymer is a brominated rubbery copolymer of isobutylene and isoprene.

11. A process as in claim 8 wherein the nitrogen-sulfur containing compound is 1,5-diphenyl-1,2-dehydro-3-thiocarbazide.

12. A process as in claim 8 wherein the nitrogen-sulfur containing compound is 2,3-butanedione oxime thiosemicarbazone.

13. A process as in claim 8 wherein the nitrogen-sulfur containing compound is thiosemicarbazide.

References Cited by the Examiner
UNITED STATES PATENTS

| | | | |
|---|---|---|---|
| 2,852,498 | 9/58 | Bradley et al. | 260—79.5 |
| 2,911,393 | 11/59 | Brooks et al. | 260—79.5 |
| 2,955,102 | 9/60 | Clayton et al. | 260—79.5 |
| 3,022,275 | 2/62 | Lober et al. | 260—79 |

LEON J. BERCOVITZ, *Primary Examiner.*